Aug. 15, 1944.     C. A. CADWELL     2,355,627
WELDING
Filed Jan. 21, 1941

INVENTOR.
CHARLES A. CADWELL
BY Oberlin, Limbach & Day
ATTORNEYS

Patented Aug. 15, 1944

2,355,627

UNITED STATES PATENT OFFICE 2,355,627

WELDING

Charles A. Cadwell, Cleveland, Ohio, assignor to The Electric Railway Improvement Company, Cleveland, Ohio, a corporation of Ohio Application January 21, 1941, Serial No. 375,099

1 Claim. (Cl. 75—27)

This invention relates as indicated to welding, and more particularly to a method of welding in which molten metal produced by the exothermic reaction of a metallic oxide and a strong reducing agent such as aluminum is employed as the welding agent.

This application is a continuation-in-part of my co-pending applications Serial No. 243,394, filed December 1, 1938, which has since become abandoned, and Serial No. 107,051, filed October 22, 1936, now Patent No. 2,238,926.

While it has long been known to produce certain metals from their oxides by exothermic reaction of the same with strong reducing agents such as aluminum, certain of such reactions have been so violent as to be uncontrollable for any practical purpose, such as the employment of the molten metal produced in welding operations, and the like. One such reaction is that of black copper oxide and aluminum which is so extremely rapid and produces such an unusual amount of heat that the copper produced thereby is volatilized and the reaction itself almost explosive in character. In my application Serial No. 245,954, above mentioned, I describe a reactant material capable of producing molten copper in a practical manner for use in welding.

Different types of welding operations involve different problems and this is nowhere better illustrated than in the cast welding of copper or copper alloy rail bond conductors to steel rails. This is largely due to the very different melting points and thermal conductivities of the copper bonds and the steel of the rail, the fact that it is desired to interfuse the end of each strand of a stranded conductor in the welded terminal, the necessity of avoiding any substantial local modification of the crystalline structure of the steel, and the various positions in which bonds are attached to rails, i. e.—on the side of the rail head, on the web, and on the base of the rail. For example, when attaching small signal bonds to the side of the rail head it is desired to employ but a very small quantity of weld metal to effect the union. Unless such weld metal be superheated, the small body of weld metal will be rapidly cooled on its passage into the mold cavity in which the end of the conductor is positioned adjacent the rail head and the bond conductor and rail will conduct away sufficient of the heat to prevent a proper interfusion of the metals and a homogeneous welded terminal.

On the other hand, if weld metal of a temperature suitable for the welding of such signal bond terminals be employed in the production of the much larger terminals of power bonds on the base of the rail, such relatively large body of superheated molten welding metal will have a decided tendency to gouge and even penetrate the base of the rail due to the fact that such a large body of welding metal does not so readily dissipate its heat and also due to the fact that in the case of such power bonds the welding metal will generally be allowed to fall from above to impinge on the base of the rail at an angle substantially normal thereto. As these examples illustrate, it is for practical purposes exceedingly desirable to regulate the production of the welding metal in such manner that the same may be suitable for the particular use for which it is intended. When thus properly regulated, satisfactory welds may be produced without the necessity of employing cumbersome arc welding apparatus, semi-portable furnaces and the like as has been previously the practice. Also, in the case of rail bonds, an ideal mechanical and electrical connection of the bond to the rail is secured in a minimum of time, and without injury to the rail as compared to the method involving drilling of the rail and inserting pins in the holes thus produced, a method still much in use.

It is, therefore, a primary object of this invention to provide a method of welding wherein the molten welding metal may be produced in a manner and at a temperature regulated according to the purpose for which such welding metal is destined.

Another object of this invention is to provide a method of welding employing molten copper.

A further object is to provide a method of attaching copper rail bonds to steel rails.

Other objects of this invention will appear as the description proceeds.

To the accomplishment of the foregoing and related ends, said invention, then, consists of the means hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

Figure 1:
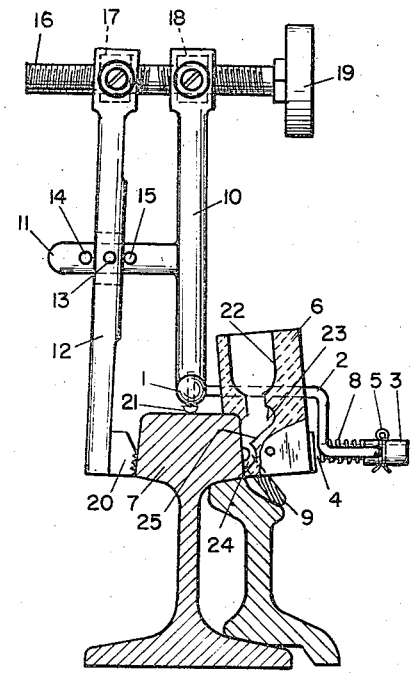
Fig. 1 is a side elevational view of one form of apparatus particularly adapted for use in accordance with this invention, a portion of the mold block being cut away to show the internal arrangement thereof.

Referring now more particularly to the drawing, and especially Fig. 1, the form of apparatus there illustrated comprises a frame piece 1 to which an angular metal frame 2 is attached supporting a housing 3 in which a rod 4 is slidably mounted by means of a pin 5 passing through such housing and fitting in a slot in such rod. A mold block 6 is tiltably mounted on an axis parallel to the rail 7 on the end of such rod and is held in resilient relation to the housing by means of a spring 8 interposed between such mold block and housing. Two such mold blocks are desirably employed, supported as above described, and properly spaced to receive the respective ends of the signal bond 9. Midway on said frame piece 1 and midway between the two mold blocks is a fixedly attached upright fulcrum arm 10 having a lateral arm 11 located substantially midway of its length and on which a second fulcrum arm 12 is pivoted by means of a pin 13, the location of the pivotal point on said lateral arm being adjustable by the optional employment of holes 14 or 15. Extending between the upper ends of fulcrum arms 10 and 12 is a screw member 16 having oppositely pitched threads on its respective end portions which are respectively engaged in threaded blocks 17 and 18 pivotally supported in the upper ends of such fulcrum arms. At one end of such screw member is a hand wheel 19 whereby it may be conveniently rotated in either direction to selectively move the upper ends of the fulcrum arms toward and away from each other and to correspondingly unclamp and clamp the mold block 7 against the face of the rail head, the fulcrum arm 12 being provided at its lower end with a clamping foot 20 adapted to engage the face of the rail head opposite to that engaged by mold block 6. By virtue of spring 8 the mold block is substantially self-adjusting in accommodating itself to the inclination of the side of the rail head. The position of the molds vertically against the side of the rail head may be regulated with precision by adjusting screws such as 21 which support frame piece 1 on the head of the rail. The upper portion of the mold block, which is fashioned of a refractory material such as graphite, is hollowed out to form a crucible 22 communicating by way of a sprue passage 23 with the mold cavity 24 in which the end of the conductor is adapted to be positioned. Such sprue passage is furthermore provided with a shelf or step 25 adjacent its lower end.

In accordance with this invention molten metal is produced by the exothermic reaction of a metallic oxide such as black copper oxide and a strong reducing agent such as aluminum, and the temperature of such molten metal is regulated so that such temperature is below the volatilization point of the metal but sufficiently high to ensure a homogeneous weld. A convenient way of so regulating the temperature of the welding metal is to alloy the aluminum with sufficient copper metal whereby a controllable reaction is ensured and the volume of welding metal produced enlarged. I have found that if a eutectic alloy of the aluminum and copper be employed such alloy when mixed with a proper amount of copper oxide in the form of roasted copper mill scale and ignited will produce molten copper metal superheated to what is substantially the maximum temperature at which such molten metal may practicably be employed. Such eutectic alloy will contain approximately 35% aluminum and 65% copper by weight. This alloy has an attendant advantage inasmuch as it is extremely brittle and therefore readily crushed to the desired granular size. Pure aluminum, on the other hand, is relatively difficult to obtain in the proper size granules. Superheated copper metal produced by the reaction of the ingredients last described constitutes a very satisfactory welding agent for attaching the small signal bonds to the side of the rail head. The weld metal is so hot that even when but a small quantity is produced it is sufficient to interfuse the conductor strands and form a homogeneous weld with the steel surface. When a larger quantity of such metal, however, is employed to cast weld the terminals of large power bonds on the base of the rail, it is found that the weld metal will gouge into the steel and on occasion even pierce the rail. For this operation an alloy containing 30% aluminum and 70% copper, together with the proper amount of copper oxide, has been found to furnish welding metal of sufficient temperature to produce a homogeneous weld without any damage to the rail. In other words, the proper amount of copper metal is incorporated to absorb a predetermined amount of the heat generated by the reaction whereby the weld metal is obtained at the desired temperature. Instead of varying the percentage composition of the alloy the same result may be obtained by adding the proper amount of small copper chips to the eutectic 65%-35% copper aluminum alloy. In fact, copper chips may be employed in conjunction with metallic aluminum to obtain the desired temperature regulation if "red" copper mill scale be employed, such scale having a lower proportion of oxygen than the roasted black scale.

It will be seen from the foregoing that a method has been provided whereby the temperature of the molten welding metal may be regulated in accordance with the use to be made of the same and it is, for example, no longer necessary to pour a large quantity of such molten metal against a rail face to preheat the same and the mold prior to casting of the bond terminal.

Such method employing molten copper produced by an aluminothermic reaction is adapted to the welding of copper rail bonds to steel rails where iron "Thermit" is not, since molten iron solidifies at a considerably higher temperature than molten copper with the result that the iron weld metal would be solid while the end of the copper conductor is still fluid and the latter would draw away from the iron. A similar problem would be encountered if it were attempted to weld two copper surfaces, employing iron "Thermit."

The reaction mixture for the production of molten copper will desirable contain small quantities of certain constituents to ensure soundness of the metal such as tin oxide and manganese dioxide. Such alloying elements also enhance the tendency of the molten metal to flow along and envelope the individual strands of a stranded conductor. An example of a composition suitable for employment in the attachment of small signal bonds is the following:

|  | Parts |
|---|---|
| Roasted copper mill scale | 40 |
| 65-35 copper aluminum alloy | 17 |
| Tin oxide | 1 |
| Manganese dioxide | .5 |

A small amount of zinc oxide may also be included.

The various ingredients are thoroughly mixed and charges to provide the desired amount of molten welding metal measured out into cylindrical cardboard containers or cartridges. A small amount of an ignition material of a type well known for inaugurating such reactions may first be placed in the bottom of the container and the container capped after being filled with the charge. Such cartridge may thus be employed simply by removing the cap and inverting into the crucible, whereupon the ignition powder will automatically rest on top of the charge in the crucible ready to be ignited by a match or spark gun. The ignition material may include powdered magnesium or red phosphorus as the primary heat producing ingredient.

It is desirable that when the stream of molten metal descends from the crucible to the mold cavity it should be caused to spread out somewhat and impinge at a definite angle to the rail surface. If a thin pencil-like stream of super-heated metal strikes the rail there is danger of "gouging" the rail and locally modifying the crystalline structure of the steel to an extent which may weaken its ability to withstand the stresses to which it is subjected in service. It is generally desirable, however, that the stream of molten metal impinge at a slight angle, at least, to the rail surface to ensure a strong welded union instead of the cold shot which may otherwise result when employing very small quantities of welding metal. By spreading out the stream of metal as by a step or shelf in the sprue passage leading from the crucible to the mold cavity the hot metal may be prevented from damaging the rail even when striking the same more or less directly as it is discharged from the sprue passage. Reference may be had to my co-pending application Serial No. 370,015, filed December 13, 1940, for certain details of mold construction and the like whereby, the above desirable features may be conveniently obtained.

Figure 2:
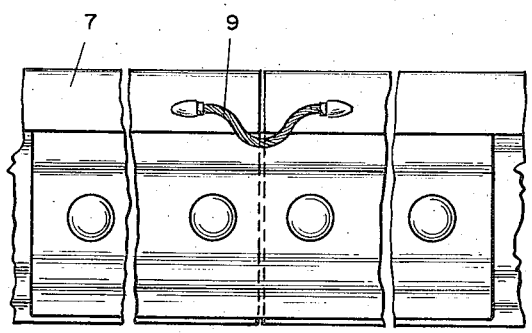
Fig. 2 is an elevational view of a rail joint showing a small size signal bond having cast welded terminals.

Referring again to the drawing in view of the above discussion, and particularly Fig. 1, the side of the rail head is first scraped clean at the points where the ends of the conductor are to be attached and the mold apparatus clamped in place with the ends of the small signal bond held in the mold cavity. A thin tin-plated steel disc or "gate" is dropped in the crucible to close the opening to the sprue passage and a cartridge containing black copper oxide (roasted mill scale) and 65-35 copper-aluminum alloy discharged into the crucible. Upon ignition of the charge the metal gate is melted and a unit mass of superheated molten copper drops into the mold cavity, interfusing the strands of the bond conductor and forming a homogeneous weld with the steel surface. Fig. 2 illustrates a bond thus attached showing the small terminals obtained.

Figure 3:
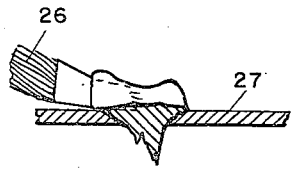
Fig. 3 is a side elevational view, partly in cross section, showing the terminal of a power bond cast welded to the base of a rail employing the same welding material employed in the production of the terminals of Fig. 2.
Figure 4:
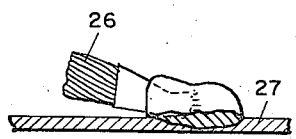
Fig. 4 is a similar view of a power bond terminal produced by the employment of welding material including an increased amount of non-reactant metal.
Figure 5:
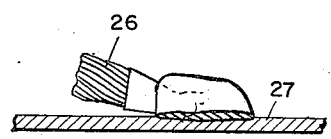
Fig. 5 is a similar view of a power bond terminal formed of metal produced by welding metal, the temperature of which has been properly regulated in accordance with this invention.

Referring now to Figs. 3, 4 and 5, such figures show terminals of large power bonds 26 attached to the base of the rail 27. When employing welding material of a composition identical with that used in attaching the small signal bond as above described the result illustrated in Fig. 3 is obtained, the superheated metal actually penetrating completely through the steel. A better result was obtained as illustrated in Fig. 4 when additional copper was alloyed with the aluminum but the steel rail was still gouged unduly. Employing a 70-30 copper-aluminum alloy in the mixture, however, gave a terminal as shown in Fig. 5 which is firmly attached to the rail but without causing any damage thereto. In other words, the temperature of the molten welding metal was regulated to obtain the desired result and it thus becomes possible to prepare cartridges of material which will give satisfactory results in the attachment of a certain size bond in a stated manner. As previously noted, copper chips might have been added to the mixture including the 65-35 copper-aluminum alloy to increase the proportion of heat absorbing non-reactant metal to the desired amount.

Instead of employing black roasted copper mill scale and a copper-aluminum alloy to obtain the desired regulation of the exothermic reaction and the temperature of the molten metallic product, I have found that a similar effect may be obtained by varying the oxygen content of the copper oxide which is reacted with metallic aluminum. As previously noted, if black roasted copper mill scale be mixed with pure granulated aluminum and such mixture ignited, the resultant reaction is extremely violent and uncontrollable without the production of molten copper in a state suitable for use in welding. If, however, such black copper scale which has been reduced to a lower oxygen content or so-called "red" copper mill scale, be employed to react with the (unalloyed) aluminum, a reaction may be obtained which is entirely controllable and productive of molten copper at a temperature suitable for the cast welding of copper bonds to steel rails. Generally speaking, the temperature of the molten metallic product of the reaction will depend upon the amount of combined oxygen in the copper scale and I have found that such scale should contain an amount of combined oxygen sufficient when reduced by the aluminum during the exothermic reaction to yield an amount of heat sufficient to elevate the entire molten metallic product of the reaction to a temperature at least slightly in excess of the melting point of iron but not substantially in excess of 3500° F. In other words, for the purposes of this invention, the temperature of the molten copper to be employed in cast welding the terminals of rail bonds should be at least about 2700° F., but not substantially in excess of 3500° F. If the molten copper should be superheated substantially above such stated maximum not only will it tend to gouge the rail and locally modify the crystalline structure of the steel unduly, but also, if the temperature be sufficiently elevated, the copper will approach its volatilization point with attendant obviously objectionable features such as a violent and uncontrollable reaction.

The so-called "red" copper mill scale may be black on the surface but does not contain nearly as much combined oxygen as the black roasted copper mill scale and such latter scale in turn does not contain nearly as much combined oxygen as the theoretical maximum of pure copper oxide. Whereas such black copper scale may not be satisfactorily reacted with aluminum to produce molten copper suitable for use in welding without the presence of a modifying agent such as copper metal alloyed with the aluminum, the "red" copper scale which contains substantially less oxygen may be satisfactorily reacted with aluminum without the presence of copper alloyed therewith or of copper chips in the mixture, if aluminum in the proper form be employed. I have found that commercial granulated aluminum produced by pouring a thin stream of molten aluminum into water does not generally produce a controllable reaction when employed in conjunction with the copper oxide. This is believed to be largely due to the presence of an oxide and hydroxide film on the surface of the aluminum particles since if aluminum filings are employed, thus affording relatively uncoated surfaces of metallic aluminum, an entirely satisfactory reaction is produced. Other forms of uncoated aluminum may be employed such as aluminum flakes, although small uncoated particles of the type of the aforesaid filings are much preferred since they adapt themselves to a more permanent and uniform mixture with the oxide.

As above stated, I have found that for most purposes the temperature of the molten metallic product of the exothermic reaction when employing simply "red" copper mill scale and aluminum filings, may be satisfactorily regulated by employing scale of the proper oxygen content, such oxygen content being increased by roasting to a desired degree in the presence of air and lessened by reduction with hydrogen. Additionally, as in the case of the black roasted mill scale, copper chips may be incorporated in the "red" copper scale-aluminium mixture to lower the temperature of the molten metal produced.

When producing molten copper for the cast welding of the terminals of small signal bonds, the proportion of copper scale to aluminum will generally be about 10:1, no other modifying agent being required in the mixture with the exception of course of very small percentages of the ingredients which are usually included to ensure soundness of the metal (zinc oxide, tin oxide, and the like). Broadly, under proper conditions, mixtures of copper scale and aluminum ranging from about 6:1 to 14:1 may be employed without the necessity of adding copper chips or alloying copper with the aluminum, depending on the purpose for which the molten copper is to be employed. However, the proportion of copper scale to aluminum in such compositions will generally range from about 7.5:1 to 11:1, depending upon the temperature of the molten metal desired.

A typical example of compositions in accordance with this invention follows:

| | Grams |
|---|---|
| "Red" copper mill scale | 20 |
| Aluminum filings | 2.2 |
| Zinc oxide | 0.05 |
| Tin oxide | 0.05 |
| Zirconium aluminum | 0.05 |
| Ferro silicon zirconium | 0.05 |

It has further been found that very satisfactory results are obtained employing aluminum having a small quantity of zinc alloyed therewith.

From the foregoing it is apparent that a method of welding has been provided by which molten copper metal may be conveniently produced at a substantially predetermined temperature suited to the particular welding operation in view.

Other modes of applying the principle of my invention may be employed instead of the one explained, change being made as regards the composition and method herein disclosed, provided the ingredients or steps stated by the following claim or the equivalent of such stated ingredients or steps be employed.

I therefore particularly point out and distinctly claim as my invention:

A welding material for use in an exothermic reaction, comprising a mixture of aluminum and a copper oxide containing an amount of combined oxygen sufficient when reduced by said aluminum during the said exothermic reaction to yield an amount of heat sufficient to elevate the entire molten metallic product of the reaction to a temperature of at least 2700° F. but not substantially in excess of 3500° F.

CHARLES A. CADWELL.